US006766172B1

(12) United States Patent
Tokuda et al.

(10) Patent No.: US 6,766,172 B1
(45) Date of Patent: Jul. 20, 2004

(54) ROAD VEHICLE COMMUNICATION METHOD USING LIGHT AND RADIO

(75) Inventors: Kiyohito Tokuda, Saitama (JP); Kinya Asano, Kanagawa (JP); Masayuki Fujise, Kanagawa (JP); Fumihide Kojima, Kanagawa (JP); Masahiro Watanabe, Kanagawa (JP); Ryobun Tachita, Kanagawa (JP)

(73) Assignees: Oki Electric Industry Co., Ltd., Tokyo (JP); Communications Research Laboratory, Ministry of Posts and Telecommunications, Tokyo (JP); Matsushita Communication Industrial Co., Ltd., Kanagawa (JP)

(*) Notice: Subject to any disclaimer, the term of this patent is extended or adjusted under 35 U.S.C. 154(b) by 400 days.

(21) Appl. No.: 09/665,599

(22) Filed: Sep. 19, 2000

(30) Foreign Application Priority Data

Sep. 20, 1999 (JP) ........................................... 11-264726

(51) Int. Cl.[7] ................................................ H04Q 7/20
(52) U.S. Cl. ........................ 455/445; 455/436; 455/905
(58) Field of Search ................................ 455/445, 436, 455/438, 439, 440, 441; 370/229, 238, 235; 340/905, 991, 993

(56) References Cited

U.S. PATENT DOCUMENTS 5,548,806 A    8/1996  Yamaguchi et al.
5,572,221 A   11/1996  Marlevi et al.
5,809,395 A *  9/1998  Hamilton-Piercy et al. .. 455/4.1

FOREIGN PATENT DOCUMENTS

EP    0 673 177 A2    9/1995
EP    0 883 266 A2   12/1998
JP    10-145286       5/1998

OTHER PUBLICATIONS

Kiyohito Tokuda, "Road-Vehicle Communication System based on Radio on Fiber Technology", JARI (Japan automobile Research institute) Research Journal, vol. 21, No. 10, p. 563–565, Oct. 1, 1999.
Kiyohito Tokuda, et al, "Radio on fiber Technology for Intelligent Transport Systems", Oki Denki Kenkyu Kaihatsu, Oki Electric Industry Co., Ltd., vol. 66, No. 2, pp. 79–82, Oct. 20, 1999.

* cited by examiner

*Primary Examiner*—Lee Nguyen
(74) *Attorney, Agent, or Firm*—Rabin & Berdo, P.C.

(57) ABSTRACT

A road vehicle communication method allows bothway communication to be held between a mobile station, which sends a request for an information service and receives it, and a central base station and local base stations located at a roadside for sending the information service to the mobile station. The central base station and the local base stations use optical fibers in part of the transmission path thereof for the bothway communication and perform at least one of electric-to-optical conversion and optical-to-electric conversion. The mobile station is caused to send the request for an information service beforehand. In response to the request, the local base station covering the mobile station expected to receive the information service is estimated. When the mobile station lies in a service area to which the local base station estimated is assigned, a control station is caused to provide the mobile station with information corresponding to the information service requested.

19 Claims, 4 Drawing Sheets

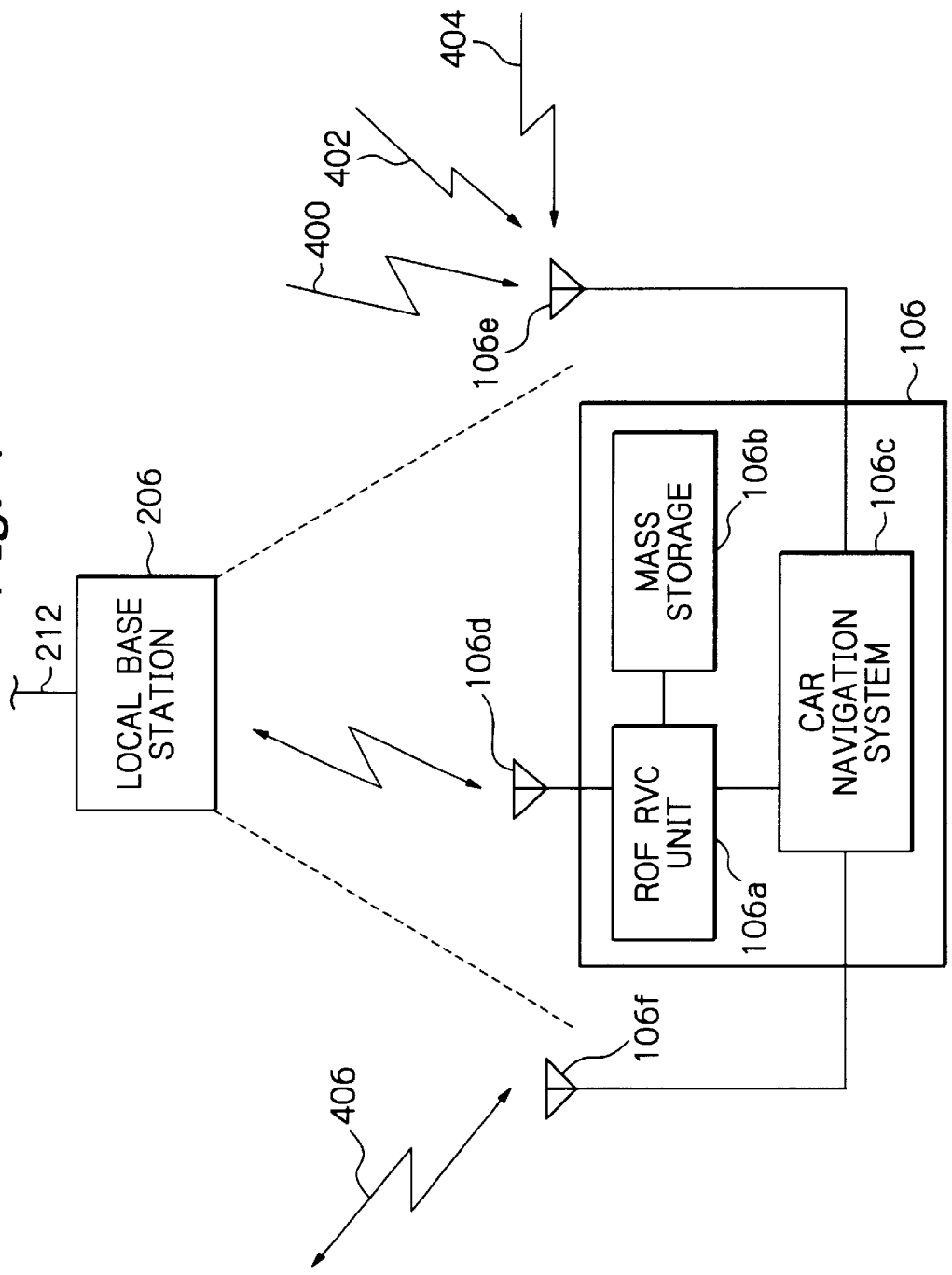

ROAD VEHICLE COMMUNICATION METHOD USING LIGHT AND RADIO

BACKGROUND OF THE INVENTION

1. Field of the Invention

The present invention relates to a road vehicle communication method using light and radio and advantageously applicable to a reservation download type of asymmetric communication system. This type of communication system belongs to a family of Road Vehicle Communication (RVC) systems capable of providing automotive vehicles with information services by ROF (Radio On Fiber), which implements radio communication between the vehicles and roadsides by use of optical fibers.

2. Description of the Background Art

Wired services and wireless services are available with an asymmetric communication system. Wired services use, e.g., ADSL (Asymmetric Digital Subscriber Line) or CATV (Cable Television) Internet while wireless services use communication satellites. ADSL and CATV Internet are implemented by existing metallic telephone lines and exclusive coaxial cables for CATV, respectively. As for wireless services, telephone lines and satellites are assigned to up-going channels (requests for information services) and down-going channels (provision of information services), respectively.

A request for an information service, whether it be wired or wireless, and the provision of the same are effected substantially at the same time at the same location. Locations where information services are available are fixed. The maximum communication rate available on down-going channels is 1 Mbps (megabits per second).

There is an increasing demand for information services that users can receive at destinations or while in movement. To meet this demand and considering the fact that some information services deal with audio, video or similar mass information, environments that allow users to receive services rapidly without any stress are essential.

Wired services are, however, provided only at fixed locations. Likewise, wireless services are received from satellites via fixed antennas, so that communication terminals to receive the services via the antennas are also fixed in place. Further, such information service systems are not feasible for the transmission of mass information because the maximum communication rate is 1 Mbps, as stated earlier.

Moreover, each information service is implemented as an exclusive system independent of the other systems. In addition, information service systems linked to other networks or media have not been reported yet.

SUMMARY OF THE INVENTION

It is therefore an object of the present invention to provide a road vehicle communication method capable of providing a mobile station with mass information rapidly when the mobile station reaches a destination or while it is running at high speed.

An RVC method of the present invention allows bothway communication to be held between a mobile station, which sends a request for an information service and receives it, and a central base station and local base stations located at a roadside for sending the information service to the mobile station. The central base station and the local base stations use optical fibers in part of the transmission path thereof for the bothway communication and perform at least one of electric-to-optical conversion and optical-to-electric conversion. The mobile station is caused to send the request for an information service beforehand. In response to the request, the local base station covering the mobile station expected to receive the information service is estimated. When the mobile station lies in a service area to which the local base station estimated is assigned, a control station is caused to provide the mobile station with information corresponding to the information service requested.

BRIEF DESCRIPTION OF THE DRAWINGS

The objects and features of the present invention will become more apparent from the consideration of the following detailed description taken in conjunction with the accompanying drawings in which:

FIG. 4 is a schematic block diagram showing a specific configuration of a mobile station applicable to the system of FIG. 1.

DESCRIPTION OF THE PREFERRED EMBODIMENT

Figure 1:
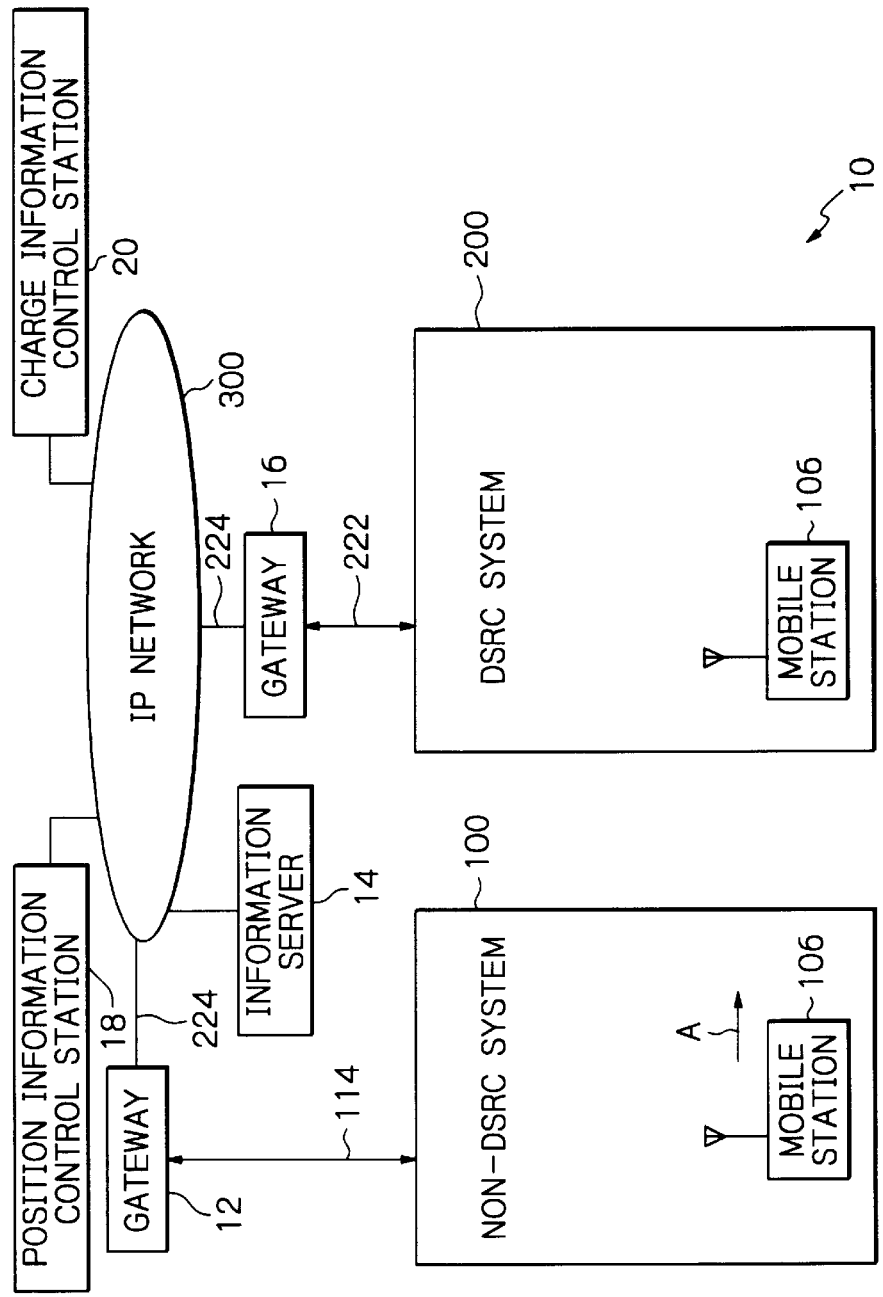
FIG. 1 is a block diagram schematically showing an ROF road vehicle communication system with which a road vehicle communication method embodying the present invention is practicable.

Referring to FIG. 1 of the drawings, an asymmetric RVC system for practicing an RVC method embodying the present invention is shown and implemented as an ROF communication system. In FIG. 1, part of the RVC system not relevant to the understanding of the present invention is not shown. Signals are designated by reference numerals attached to connection lines on which they appear.

As shown in FIG. 1, the RVC system, generally 10, includes a non-DSRC system 100, a DSRC system 200, and an IP (Internet Protocol) network 300. A mobile station or automotive vehicle 106 sends a request for an information service via the non-DSRC system 100 and receives the information service via the DSRC system 200. Information to be provided exists on the IP network 300. DSRC refers to a beacon communication system, particularly exclusive road vehicle communication using local radio zones.

Figure 2:
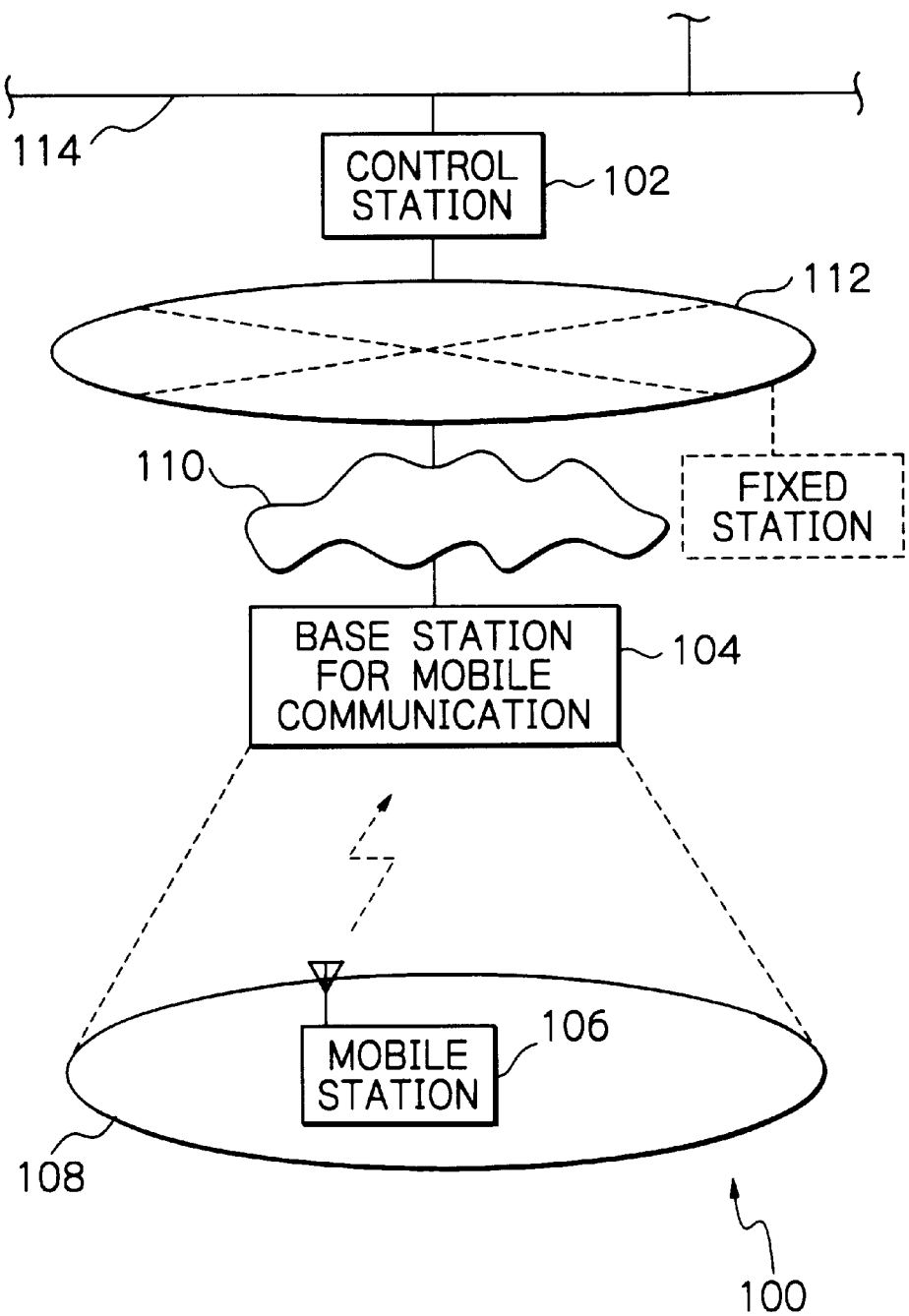
FIG. 2 is a schematic block diagram showing a non-DSRC (Dedicated Short Range Communication) system included in the system of FIG. 1.

The non-DSRC system 100 implements short-range communication for a non-ITS (Intelligent Transport System) or advanced road communication system. FIG. 2 shows a specific configuration of the non-DSRC system 100. As shown, the non-DSRC system 100 includes a control station 102 and a base station 104 for mobile communication as well as the mobile station 106. The control station 102 assigns an address to the mobile station 106 (address assigning function) and guarantees mobile transmission of data (route controlling function). The term "mobile transmission of data" refers to control that maintains, e.g., an IP address assigned to the mobile station 106 even after the travel of the mobile station 106. This can be done with, e.g., a mobile IP or VIP (Visual Intelligent and Personal).

The base station 104 for mobile communication communicates by radio with a microcell 108 that defines a service area for providing information services. The mobile station 106 is a terminal unit capable of sending a request for an information service and receiving the information service. The mobile station 106 will be described more specifically later.

The control station 102, base station 104 and mobile station 106 and a relation therebetween will be described hereinafter, bottom-up. The mobile station 106 existing in the microcell 108 sends a request for an information service to the base station 104. In response, the base station 104 communicates with the control station 102 via a mobile communication network 110 and/or a wired communication network 112. The mobile communication network 110 and wired communication network 112 may be, e.g., a handy phone network and PSTN (Public Switched Telephone Network), respectively. The control station 102 is connected to a gateway 12 (see FIG. 1) via a PSTN 114.

In the illustrative embodiment, the gateway 12 is connected to the IP network 300 (see FIG. 1). The gateway 12 is capable of converting a protocol. Therefore, the request for an information service sent from the mobile station 106 is transferred to an information server 14 via the gateway 12 and IP network 300.

Figure 3:
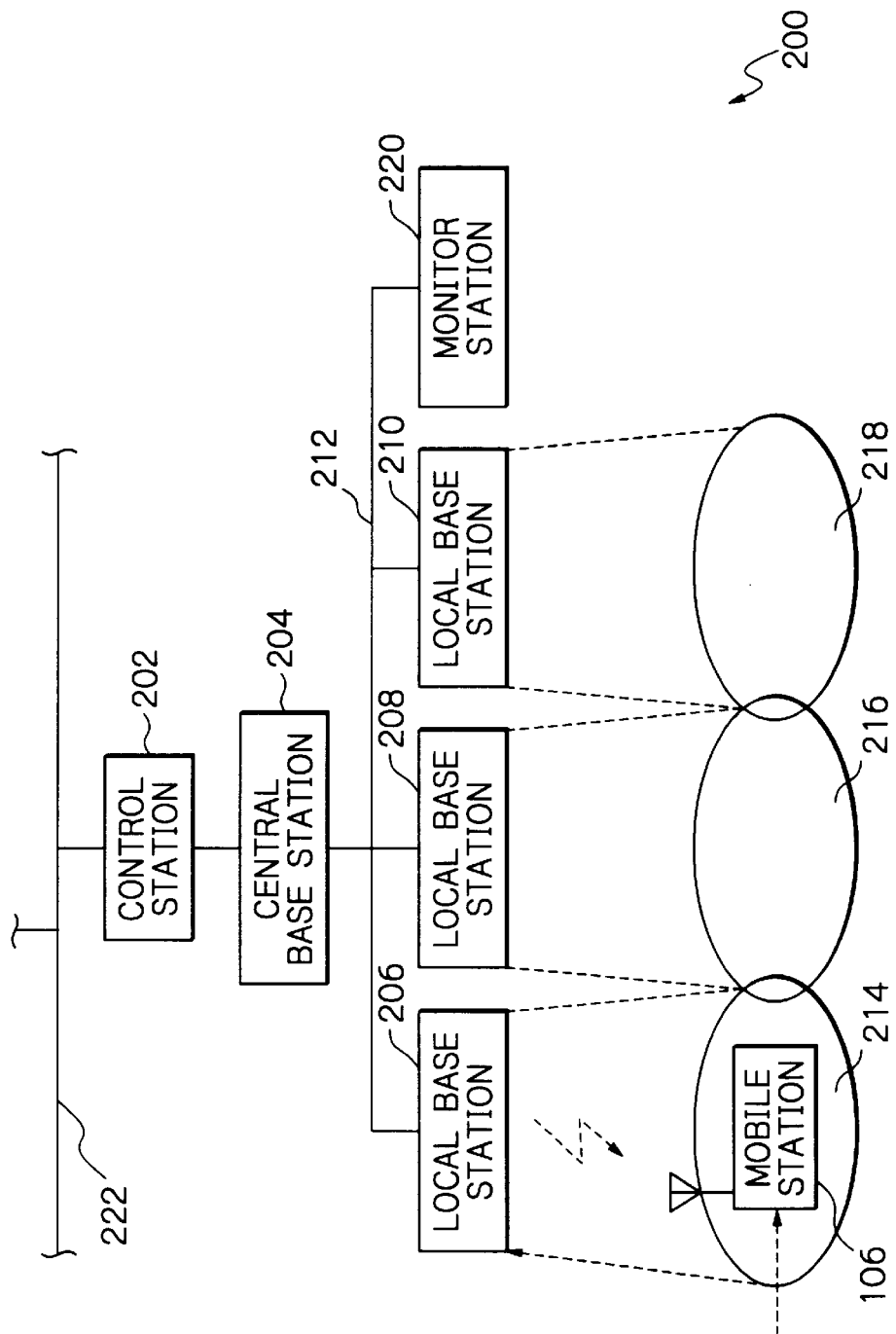
FIG. 3 is a schematic block diagram showing a DSRC system also included in the system of FIG. 1.

The DSRC system 200 is shown in FIG. 3 specifically. As shown, the DSRC system 200 includes a control station 202, a central base station 204, and a plurality of (three in the illustrative embodiment) local base stations 206, 208 and 210. The mobile station 106 is assumed to travel from the non-DSRC communication system 100, FIG. 1, to the DSRC communication system 200, as indicated by an arrow A in FIG. 1. The control station 202, like the control station 102 of the non-DSRC communication system 100, has an address assigning function and a route controlling function. The control station 202 additionally has a buffering function for temporarily holding information sent from the information server 14 and meant for the mobile station 106, and an authenticating function for authenticating the mobile station 106.

The integrating control station 204 includes a frequency converting circuit, a signal distributing and connecting circuit, and a radio/light converting circuit, although not shown specifically. The integrating control station 204 is connected to the local base stations 206 through 210 by optical fibers 212.

The local base stations 206 through 210 each include a light/radio converting circuit, a signal amplifying circuit, and a transmit/receive antenna, although not shown specifically. The local base stations 206 through 210 each communicate with the central base station 204 via the optical fibers 212 and communicate with the mobile station 106 by radio.

The local base stations 206 through 210 respectively cover service areas 214, 216 and 218 for providing the mobile station 106 with information services. The service areas 214 through 218 are microcells belonging to the DSRC system 200.

As also shown in FIG. 3, a monitor station 220 is connected to the central base station 204 and local base stations 206 through 210 by the optical fibers 212. The monitor station 220 measures the radio wave environments of the local base stations 206 through 210 with, e.g., sensors while monitoring the service areas 214 through 218 with, e.g., CCD (Charge Coupled Device) type cameras. Further, the monitor station 220 sends the resulting data to the control station 202 via the central base station 204 at a preselected period.

The control station 202 is connected to a gateway 16, PSTN 224 (see FIG. 1) via an ROF RVC network 222. The gateway 16 is connected to the IP network 300 and also has a protocol converting function.

The mobile station 106 sends a request for an information service in the service area 108 of the non-DSRC system 100 and then receives the information service in any one of the service areas 214 through 218 of the DSRC system 200. The mobile station 106 may alternatively send the above request while traveling in any one of the service areas 214 through 218.

Referring again to FIG. 1, the information server 14 stores music or similar audio data compressed by MP3 (MPEG (Moving Picture Experts Group)-1 Audio Layer 3) or similar compression scheme and video data compressed by MPEG-1, MPEG-2, MPEG-4 or similar compression scheme. The information server 14 provides the mobile station 106 with such data in accordance with the request received from the mobile station 106. While the information server 14 is shown as being connected to the IP network 300, it may alternatively be connected to the PSTN 114 or the RVC network 222, if desired.

A position information control station 18 and a charge information control station 20 are also connected to the IP network 300. The position information control station 18 manages host identifier information particular to the mobile station 106, physical position information including GPS (Global Positioning System) information, and logical position information including IP address information. Further, the control station 18 relates map information and network construction information. In addition, the control station 18 estimates the destination of the mobile station 106 on the basis of the travel pattern and history of travel of the mobile station 106, information relating to a route that the mobile station 106 is expected to take, traffic information, and so forth.

The charge information control station 20 charges the mobile station 106 in accordance with the quantity and content of an information service provided by the information server 14.

Reference will be made to FIG. 4 for describing the mobile station 106 specifically. Assume that the mobile station 106 is located in the service area 214 covered by the local base station 206 of the DSRC communication system 200, as shown in FIG. 3. The service area 214 may, of course, be replaced with the other service area 216 or 218. As shown in FIG. 4, the mobile station 106 includes an ROF RVC unit 106a, a mass storage 106b, and a car navigation system 106c.

The ROF RVC unit 106a includes a transmit/receive antenna 106d and a signal amplifier, a signal distributor/coupler and a frequency converter that are not shown in FIG. 4. The ROF RVC unit 106a communicates with the local base station or roadside base station 206 assigned to the service area 214. In the case of a down-going channel, the ROF RVC unit 106a executes a procedure inverse to the procedure of the central base station 204. The ROF RVC unit 106a is capable of dealing with the millimeter-wave band.

The mass storage 106b is implemented by, e.g., a hard disk or a DVD-RAM (Digital Video Disk-Random Access Memory) and stores information received from the information server 14. The mass storage 106b is capable of sharing media with the storages of fixed terminal units connected to a wired network.

The car navigation system 106c is loaded with a DVD-ROM (Digital Video Disk-Read Only Memory) and capable of receiving a radio wave from a GPS satellite via an antenna 106e. The system 106c compares information stored in the DVD-ROM and position information derived from the radio wave coming in through the antenna 106e. The system 106c then displays the current position of the mobile station 106 and a route to a destination on a monitor, not shown, for guiding the occupant of the mobile station 106 to the destination. Further, the system 106c is capable of reading the information stored in the mass storage 106b or displaying the information directly on the monitor via the ROF RVC system 106a.

The car navigation system 106c includes an antenna 106e for receiving a radio wave 400 from a GPS satellite, a radio wave/optical beacon type of signal 402 from VICS (Vehicle Information and Communication System) and/or an FM (Frequency Modulation) multiplexed radio wave 404. The FM multiplexed radio wave 404 may be a D (Differential)-GPS signal to which a VICS signal and correction data are added in order to reduce position errors.

The car navigation system 106c may additionally include a transmit/receive antenna 106f assigned to a handy phone/PHS (Personal Handyphone System) radio wave 406. To communicate with a handy phone/PHS via the antenna 106f, the system 106c uses existing or extra transmission/receipt circuitry. Alternatively, the antenna 106f may be included in the ROF RVC unit 106a, in which case extra handy phone/PHS transmission/receipt circuitry will be arranged in the ROF RVC unit 106a.

The local base station 206 is connected to the central base station 204 by the optical fibers 212, FIG. 3.

A specific operation of the ROF RVC system 10 will be described hereinafter. Assume that the mobile station 106 lies in the service area 108 covered by the base station 104 of the non-DSRC system 100 assigned to mobile communication, as shown in FIG. 2. In the service area 108, the mobile station 106 sets up a communication link to the base station 104 by use of the handy phone/PHS function available with the car navigation system 106c. If the mobile station 106 outputs any information service requested, the information server 14 outputs an ID (Identification) to the mobile station 106. The ID is for the sake of a reservation and information identifying the mobile station. This ID is for example, random numbers, car number ID+time information, a public key cryptogram, and so forth. The ID information is written into the mobile station 106. Also, in response, the base station 104 communicates with the control station 102 and requests it to assign an IP address to the mobile station 106. The IP address allows the position of connection of the mobile station 106 to the network to be unconditionally identified.

After the assignment of the IP address, the mobile station 106 communicates with the position information control station 18, which is connected to the IP network 300, via the non-DSRC system 100, PSTN 224 and gateway 12, as shown in FIG. 1. At this instant, the mobile station 106 sends to the position information control station 18 its own ID information, GPS position information and other physical position information, IP address information and other logical position information, history-of-travel information, and route-to-take information. The position information control station 18 registers such information particular to the mobile station 106.

Subsequently, the mobile station 106 sends a request for an information service to the information server 14, which exists on the IP network 300, via the mobile communication network 110, PSTN 112 and gateway 12. In response, the information server 14 inquires the position information control station 18 about the position of the mobile station 106 sent the request. On the receipt of the inquiry, the position information control station 18 estimates, based on the registered information relating to the mobile station 106, the DSRC system 200 to which the information server 14 should send information. The position information control station 106 then informs the information server 14 of information representative of the estimated DSRC system 200.

The information server 14 sends information read out to the DSRC system 200 designated by the information, which is received from the position information control station 18. Further, the information server 14 sends to the mobile station 106 information representative of the destination of the above information, i.e., the designated DSRC system 200. If desired, the mobile station 106 may estimate the destination of the information in place of the position information control station 18 on the basis of its own position information. In such an alternative case, when the mobile station 106 sends a request for an information service to the information server 14, the mobile station 106 adds to the request information indicative of a location (destination) where it is expected to receive the information service.

The information server 14 transfers, via the gateway 16, the information to the control station 202 of the DSRC system 200 that is the destination of the information. The control station 202 has a buffering function for temporarily holding data, as stated earlier. The control station 202 holds the information received from the information server 14 until the mobile station 106 enters any one of the service areas 214 through 218 of the DSRC system 200.

When the mobile station 106 enters any one of the service areas 214 through 218, the ROF RVC unit 106a thereof sets up a communication link to the control station 202 via one of the local base stations or roadside stations 206 through 210 belonging to the above service area, optical fibers 212, and central base station 204. At this time, the control station 202 assigns an IP address or an ID for information of reservation to the mobile station 106.

The mobile station 106 requests the control station 202 to send the reserved information service to the mobile station 106. In response, the control station 202 authenticates the mobile station 106 to which the IP address or the ID has been assigned. If the result of authentication is acceptable, the control station 202 transfers the information temporarily stored therein to the local base station 206, 208 or 210 via the central base station 204 and optical fibers 212. The local base station received the information transfers it to the mobile station 106 at a frequency lying in, e.g., the millimeter-wave band.

The mobile station 106 writes the received information in the mass storage 106b thereof and determines whether or not it has correctly received the entire information. If the answer of this decision is positive, the mobile station 106 sends its own host identifier information, end-of-receipt information and so forth to the charge information control station 20. In response, the charge information control station 20 charges the mobile station 106 for the information service.

As stated above, in the illustrative embodiment, the mobile station 106 can be provided with mass information at a time more rapidly than conventional at a destination or as soon as it enters a service area where information services are available. Because the ROF RVC communication system 10 implements service areas on a microcell basis, communication can be held even in dead areas. This successfully increases the number of users to be accommodated for a unit area. Moreover, by using a broad frequency band, it is possible to provide different kinds of services rapidly.

The illustrative embodiment has concentrated on communication between the local base stations 206 through 210 and the mobile station or on-board terminal unit 106. The on-board terminal unit 106 may, of course, be replaced with a handy portable terminal unit. In such a case, the local base stations 206 through 210 should preferably be located at, e.g., the wickets of railroad stations and the gates of event cites where traffic is heavy.

In summary, in accordance with the present invention, an RVC communication system allows a mobile station and a base station to hold bothway, asymmetric communication with each other through electric-to-optical and/or optical-to-electric conversion. The mobile station can therefore be provided with desired mass information, particularly audio and video information, in a short period of time. In addition, users can enjoy information services without any stress.

Further, because the RVC communication system using an ROF scheme implements service areas on a microcell basis and therefore allows communication to be held even in dead areas. This successfully increases the number of users to be accommodated for a unit area. Moreover, by using a broad frequency band, it is possible to provide different kinds of services rapidly.

The entire disclosure of Japanese patent application No. 264726/1999 filed Sep. 20, 1999 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A Road Vehicle Communication (RVC) method for allowing bothway communication to be held between a mobile station, which sends a request for an information service and receives said information service, and an RVC system at a roadside for sending said information service to said mobile station, wherein a central base station and local base stations use optical fibers in a part of a transmission path for said bothway communication and perform at least one of electric-to-optical conversion and optical-to-electric conversion, said RVC method comprising the steps of:

(a) causing the mobile station to send the request for an information service beforehand;

(b) estimating, in response to the request, one of said local base stations covering the mobile station expected to receive the information service; and (c) causing, when the mobile station lies in a service area to which the local base station estimated is assigned, a control station to provide the mobile station with information corresponding to the information service requested, wherein said control station comprises a buffer function of mass capacity for temporarily holding said information service.

2. A method in accordance with claim 1, wherein said step (a) comprises a step (d) of transforming information representative of the request to a protocol to be dealt with by a different network, connecting the mobile station to said different network, and sending said information to a provider capable of providing information stored therein, and wherein said step (c) comprises a step (e) of transforming information read out of said provider to a protocol to be dealt with by said control station, and causing said local base station and the mobile station sent the request to hold road vehicle communication by radio.

3. A method in accordance with claim 2, wherein the different network comprises Internet using an IP.

4. A method in accordance with claim 2, wherein the information read out of the provider is transformed to a protocol to be dealt with by a network connected to the different network, and wherein a PSTN is connected between said different network and the road vehicle communication.

5. A method in accordance with claim 2, wherein the provider provides the mobile station with at least one of audio information and video information.

6. A method in accordance with claim 5, wherein the provider is connectable to any one of the different network, the existing mobile communication system, and the RVC system using the optical fibers.

7. A method in accordance with claim 6, wherein the existing mobile communication system and the RVC system each include a procedure for assigning, at a time of connection of the mobile station and the different network, an identifier that unconditionally identifies a connection position of the mobile station to said existing mobile communication system or said RVC system to said mobile station, and a procedure for controlling mobile transmission of a route on which the information is to be provided.

8. A method in accordance with claim 1, wherein said step (a) comprises the steps of:

(d) causing, when the mobile station does not lie in the service area, said mobile station to send the request via an existing mobile communication system; and (e) causing, when the mobile station lies in the service area when sending the request, said mobile station to send said request via an RVC system using radio and available between the local base station and said mobile station.

9. A method in accordance with claim 8, wherein the existing mobile communication system uses at least one of existing telephone lines and exclusive lines.

10. A method in accordance with claim 1, further comprising a step (d) of confirming, after said step (c), a delivery of the information service to the mobile station, and charging said mobile station for said information service on the basis of at least one of a quantity and a content of said information service.

11. A method in accordance with claim 1, wherein said step (b) comprises a step (d) of relating, when estimating the local base station, physical position information and logical position information of the mobile station under control and map information and network information prepared beforehand, and estimating a destination of the mobile station by compounding at least one of related information, information representative of a movement pattern and a history of movement of said mobile station, information representative of an expected route, and traffic information.

12. A method in accordance with claim 1, wherein said steps (a) through (c) each comprise a step (d) of measuring a radio wave condition of the local base stations, which performs radio communication with the mobile station in a limited region covered by the local base station, monitoring the service area covered by said local base stations, and repeatedly sending, at a preselected period, measured data and monitored data to said control station governing said central base station and said local base stations.

13. A method in accordance with claim 1, wherein the mobile station includes a car navigation system and holds road vehicle communication with the local base stations in interlocked relation to or by using a function available with said car navigation system.

14. A method in accordance with claim 13, wherein said method is capable of communicating with a plurality of systems different from the road vehicle communication as well as with said road vehicle communication.

15. A method in accordance with claim 14, wherein the plurality of systems use at least one of an existing mobile communication system, GPS, VICS and an FM multiplexing system.

16. A method in accordance with claim 1, wherein said step (c) comprises a step (d) of preparing a mass storage in the mobile station for storing mass information provided by the provider, and reading said information out of said mass storage.

17. A method in accordance with claim 16, wherein said mass storage is capable of sharing media with storages included in fixed terminal units, which are connected to a wired network.

18. A Road Vehicle Communication (RVC) method for allowing bothway communication to be held between a mobile station, which sends a request for an information service and receives said information service, and an RVC system at a roadside for sending said information service to said mobile station, wherein a central base station and local base stations perform at least one of electric-to-optical conversion and optical-to-electric conversion with information provided at a time of provision of said information service and effect asymmetric communication via optical fibers, which constitute a part of a transmission path, for thereby dealing with a greater amount of information when said information service is provided than when said request is sent, said RVC method comprising the steps of:

(a) causing the mobile station to send the request for an information service beforehand;

(b) estimating, in response to the request, one of said local base stations covering the mobile station expected to receive the information service; and (c) causing, when the mobile station lies in a service area to which the local base station estimated is assigned, a control station to provide the mobile station with information corresponding to the information service requested, wherein said control station comprises a buffer function of mass capacity for temporarily holding said information service.

19. A Road Vehicle Communication (RVC) method for allowing bothway communication to be held between a mobile station, which sends a request for an information service and receives said information service, and an RVC system at a roadside for sending said information service to said mobile station, said method using the RVC system allowing a central base station and local base stations, which effect said bothway communication by at least one of electric-to-optical conversion and optical-to-electric conversion via optical fibers constituting a part of a communication path for said bothway communication, and said mobile station to hold radio communication with each other, said RVC method comprising the steps of:

(a) causing the mobile station, which lies in a service area covered by said local base stations of the RVC system, to send the request for an information service via the local base station, said central base station, and a control station beforehand;

(b) estimating, in response to the request, the local base station covering the mobile station expected to receive the information service; and (c) causing, when the mobile station lies in a service area to which the local base station estimated is assigned, a control station to provide the mobile station with information corresponding to the information service requested, wherein said control station comprises a buffer function of mass capacity for temporarily holding said information service.

* * * * *